Figure 1:
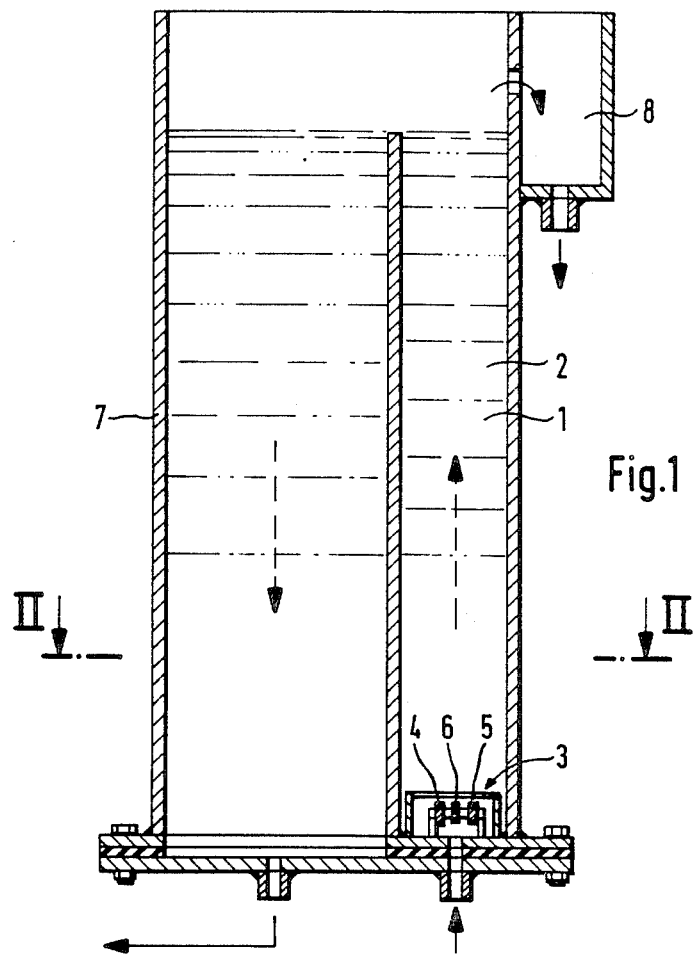

United States Patent [19]

Renzler

[11] Patent Number: 4,728,404

[45] Date of Patent: Mar. 1, 1988

[54] PROCESS FOR THE SEPARATION OF EMULSIONS CONTAINING WATER AS A CONTINUOUS PHASE AND DEVICE FOR THE APPLICATION OF THE PROCESS

[76] Inventor: Edgar Renzler, Siegstrasse 2, Köln 40 5000, Fed. Rep. of Germany

[21] Appl. No.: 865,735
[22] PCT Filed: Aug. 6, 1985
[86] PCT No.: PCT/DE85/00263
§ 371 Date: Jun. 11, 1986
§ 102(e) Date: Jun. 11, 1986
[87] PCT Pub. No.: WO86/01124
PCT Pub. Date: Feb. 27, 1986

[30] Foreign Application Priority Data

Aug. 11, 1984 [DE] Fed. Rep. of Germany ........ 3429612
Oct. 7, 1984 [DE] Fed. Rep. of Germany ........ 3437055
Nov. 12, 1984 [DE] Fed. Rep. of Germany ........ 3444074
Apr. 26, 1985 [DE] Fed. Rep. of Germany ........ 3515095
Jul. 20, 1985 [DE] Fed. Rep. of Germany ........ 3525963

[51] Int. Cl.⁴ ............................................... C02F 1/46
[52] U.S. Cl. .................................................... 204/149
[58] Field of Search ........................... 204/149, 152

[56] References Cited

U.S. PATENT DOCUMENTS 4,121,993 10/1978 Krugmann ...................... 204/149

FOREIGN PATENT DOCUMENTS 2627964 5/1978 Fed. Rep. of Germany ...... 204/149
2045803 11/1978 United Kingdom ................ 204/149

Primary Examiner—T. M. Tufariello
Attorney, Agent, or Firm—Eric P. Schellin

[57] ABSTRACT

Method for the electrolytic decomposition of O/W emulsions in an electrolysis cell powered by direct current and device for carrying out this method.

The invention is relative to the electrolytic decomposition of O/W emulsions in an electrolysis cell powered by direct current. The emulsions are decomposed according to the invention in a cell with at least one bundle of stable electrodes comprising one or more intermediate soluble metallic inlays in an acidic to alkaline range with a current consumption of 0.1 to 4 Ah/dm³ and a residence time of 2 to 360 min. in the cell as a result of coagulation and flotation. A device for carrying out this method is also described.

4 Claims, 2 Drawing Figures

U.S. Patent    Mar. 1, 1988    4,728,404

PROCESS FOR THE SEPARATION OF EMULSIONS CONTAINING WATER AS A CONTINUOUS PHASE AND DEVICE FOR THE APPLICATION OF THE PROCESS

The invention relates to a process for decomposing oil-in-water emulsions in an electrolysis cell powered by directed current and an apparatus for carrying out the method.

Due to the increased use of synthetic products based on mineral oils, which are biologically only poorly decomposable, ground and surface water is increasingly loaded with matter, such as, e.g. petroleum, diesel fuels, heating and lubricating and surface-active substances.

In consideration of the increasing environmental load, the authorities have made the discharge of these dangerous substances above certain concentrations into waters a punishable offence.

Macro-emulsions are polyphase systems with great contact surfaces and contact surface tension which does not disappear on which their instability is based. This means that these emulsions tend to reach the lowest possible energy stage, towards sedimentation or flotation and thereby finally to coalescence.

Micro-emulsions are, however, isotropic, thermodynamic stable systems, whose dispersed phase appears in the form of particles smaller than 2000 Angstrom units. They develop spontaneously by the interaction of the corresponding molar ratios of peptizing mediums, tenside, oil, and water.

The stability of emulsions is increased by the addition of emulsifying surface-active compounds. This involves bipolar substances that reduce the surface tension between the phases.

The overall stability of an emulsion is determined by the sum of the van der Waal attraction forces and the repulsion of the primarily negatively charged particles due to coulomb forces.

Coagulation and flocculation can result from the removal of the charge of the particles, i.e. the zeta potential of the emulsified particles. Should a particle move, for example as a result of an imposed electrical field, one part of the diffuse double layer is stripped off and if the energy barrier between the particles is small enough, a flocculation process can be caused only by the particles moving closer together.

To comply with the norms suggested by law, the breaking of oil/water emulsions, to avoid pollution of the environment is necessary in all circumstances. Some technical solutions are known to achieve this, namely mainly: ultrafiltration, the mixing in of de-emulsifiers, ultrasonic sound, chemical dosing, dialysis, electrocoagulation.

These processes are, however, partially associated with high investments and high operating costs and are particularly uneconomical for small quantities of highly polluted waste water. An important object of this invention was therefore to make a versatile, cost-favourable process available.

Other technical separation processes for the recovery of products concern the preparation, for example, of ores, coal, salts and dewatering, and here one of the best known processes is flotation based on the observations of W. Haynes (British Patent No. 488 of 1860). This flotation is applied in many branches of industry also in the form of electroflotation, for example in the separation of silver from used photobaths.

With this flotation gas bubbles are produced in watery solutions from the water by the aid of electrolysed hydrogen and oxygen, that is in the medium itself which is subject to the separation. In addition, the separation yield can be considerably increased by the simultaneous coagulation of the solids in the watery solution.

It is apparent that in the field of the decomposition of emulsions of the abovenamed kind, it would be a marked advance if one could apply electroflotation and electrocoagulation together with electrophoretic effects to these systems and decompose these emulsions in a progressive manner with justification of the energy involved. At the same time, it would also be possible to use this form of emulsion decomposition in the separation of organisms from nutrient solutions and to add by means of the simultaneous metal decomposition, the necessary cations to the solution to do away with present processes, namely centrifuging or flotation by the blowing in of air and the following emulsion decomposition by pH lowering and a subsequent addition of cations.

In known flotation processes for waste water purification, the required gas bubbles, especially air bubbles, are generated by porous ceramic bodies, nozzles, stirred gasifiers, pressure release of air-saturated water and even by the generation of gas bubbles from the waste water by means of electrolysis. Before flotation, flocculant and flocculation aids are added to the waste water to initiate flocculation.

In all flotation processes the efficiency of the flotation is very dependent upon the volume and the number of gas bubbles. Too-large gas bubbles and too-strong a gasification lead instead of the flotation of suspended matter to an intensive mixing of the suspension to be separated and thereby to the opposite effect.

Looking back on the difficulties of preparing emulsions of this type and of emulsified oil-polluted waste water and the considerable expense involved there has long been a need in technology to make a process available which can achieve the decomposition of emulsions of the type described above without great technical expense and without the difficulties that have been observed up to now and thereby also to render for small emulsion amounts and waste water amounts a simple and sure treatment and care and thereby to achieve the desired result not only in cost savings but especially also in the actual requirements.

The invention therefore has the task of making available a method of decomposing emulsions which can meet this requirement just described, whereby not only experts but also laymen can operate such a simple and safe system with little expense.

The invention solves this task by providing a process for electrolytic decomposition of oil/water emulsions in an electrolysis cell powered by direct current that is characterized in that the emulsions are decomposed in a cell with at least one bundle of stable electrodes comprising one or more intermediate soluble metallic inlays in an acidic to alkaline range of pH values up to about 12 with a current consumption of 0.1 to 4 Ah/dm$^3$ and a correspondingly predetermined residence time in the cell as a result of coagulation, flocculation and flotation.

This process can be carried out in a continuous as well as an intermittent manner, whereby the continuous process has a special significance.

In operations according to the invention it has been found to be advantageous to work with coagulation and flotation pH-values in the ranges of 4 to 6.8 and 8 to 12 with a current consumption of 0.1 to 4 Ah/dm$^3$ and a residence time of 5 to 120 min. It is of special value to work with coagulation and flotation pH's which range from 6.8 to 8 at a residence time of 2 to 30 min. and a current consumption of 0.1 to 2 Ah/dm$^3$.

The coagulation and flotation according to the invention are performed in a cell for which within the bundle of stable electrodes one or more soluble metal inlays are arranged, with at least one being a hydroxide-forming metal in an alkaline medium, particularly an aluminium or iron plate. The surface relationship of the electrodes to the soluble metal inlay should be, according to the invention, 1:0.1 to 1:60, in particular 1:1 to 1:20.

When carrying out the process according to the invention, it has been found to be advantageous to change the direct current direction periodically every 5 to 3600 seconds.

The process according to the invention has the great advantage that coagulant as well as gas can be produced in precisely determined quantities, whereby the bubble sizes of the gas bubbles can vary widely according to the nature of the surfaces of the stable electrodes and according to material peculiarities.

According to the invention for example, graphite, titanium, platinum coated titanium or refined steel may be used as stable electrodes.

The additional great advantage of the invention resides in the fact that no additional energy is expended to introduce coagulation means, a notable electrophoretic effect supports the method and thereby the coagulated grease and oil particles froth up due to adsorption to the gas bubbles on the surfaces of the electrolysis cell or the other collecting device and additionally, as required, a simultaneous reduction of, for example, chrome may be carried out, as is frequently necessary in waste water technology. Should any waste water contain tensides at the same time, whose remaining from the water is not the selection of the electrode surface can be used to produce a foamy flotation and that a simultaneous removal of surface-active materials can result.

An apparatus for the operation of the process according to the invention is represented in the drawings and the invention will be more fully explained with reference made to them.

Figure 2:
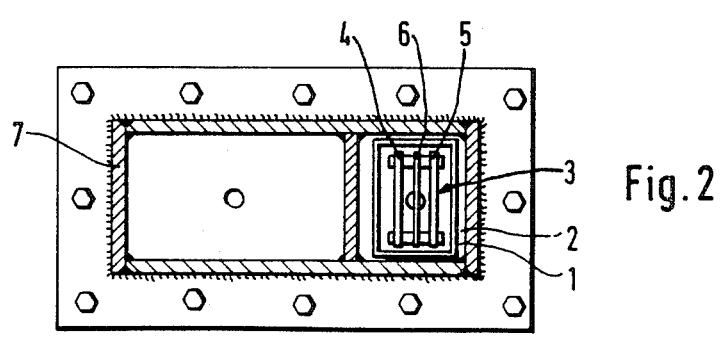

This apparatus for carrying out the process according to the invention is represented in FIG. 1 in section. This apparatus consists mainly of an electrocoagulator (1) and electroflotator (12) with the bundle (3) arranged within it, the stable electrodes (4) and (5) with intermediate metal inlay (6). The electrocoagulator (2) is in a reactor (7) with overflow system (8). The The electrocoagulator (1) combined with the reactor (7) is represented along line 11—11 in FIG. 1 in section in FIG. 2.

I claim:

1. A process for the purification of an aqueous effluent containing a fatty-oil substance as an impurity comprising charging said effluent into an electrolytic cell, said cell having at least one pair of inert electrodes, said inert electrodes having at least one non-electric touching decomposable hydroxyl producing metal structure between said electrodes, said metal being decomposable under acidic to alkaline conditions of between a pH of 4 to a pH of 12, impinging a D.C. current on said electrodes of 0.1 to 4 Ah/dm$^3$ whereby said metal structure is decomposed as a metal hydroxyl complex and wherein said thus produced metal hydroxyl complex combines with said fatty-oily substance, thereafter separating said fatty-oil substance-complex from said effluent.

2. The process of claim 1 wherein the pH of the effluent is at a range of between a pH of 4 to 12 and the dwell time is from 2 to 360 minutes.

3. The process of claim 1 wherein the surface relationship of an inert electrode to the metal structure is from 1:0.1 to 1:60.

4. The process according to claims 1–3 wherein the polarity of the D.C. electric current is switched every 5 to 3600 seconds.

* * * * *